(12) United States Patent
Kobayashi

(10) Patent No.: US 7,010,703 B1
(45) Date of Patent: Mar. 7, 2006

(54) BUS POWER-SUPPLY DEVICE AND NODE

(75) Inventor: Masahisa Kobayashi, Tokyo (JP)

(73) Assignee: NEC Corporation, Tokyo (JP)

(*) Notice: Subject to any disclaimer, the term of this patent is extended or adjusted under 35 U.S.C. 154(b) by 564 days.

(21) Appl. No.: 09/690,434

(22) Filed: Oct. 18, 2000

(30) Foreign Application Priority Data

Oct. 20, 1999 (JP) ............... 11/298181

(51) Int. Cl.
*G06F 1/26* (2006.01)

(52) U.S. Cl. ................................... 713/300

(58) Field of Classification Search ........... 713/300, 713/1
See application file for complete search history.

(56) References Cited

U.S. PATENT DOCUMENTS

| | | | |
|---|---|---|---|
| 6,125,455 A * | 9/2000 | Yeo | 714/14 |
| 6,128,743 A * | 10/2000 | Rothenbaum | 713/300 |
| 6,237,106 B1 * | 5/2001 | Koyama et al. | 713/502 |
| 6,285,092 B1 * | 9/2001 | Kawahara et al. | 307/85 |
| 6,351,818 B1 * | 2/2002 | Murai | 713/300 |
| 6,357,011 B1 * | 3/2002 | Gilbert | 713/300 |

FOREIGN PATENT DOCUMENTS

| | | | |
|---|---|---|---|
| JP | 6-295346 | | 10/1994 |
| JP | 8-69346 | | 3/1996 |
| JP | 10097352 A | * | 4/1998 |
| JP | 10-257081 | | 9/1998 |
| JP | 11-168493 | | 6/1999 |
| JP | 11-353062 | | 12/1999 |

\* cited by examiner

*Primary Examiner*—Lynne H. Browne
*Assistant Examiner*—Eric Chang
(74) *Attorney, Agent, or Firm*—Whitham, Curtis & Christofferson, PC

(57) ABSTRACT

A bus power-supply device structured to supply power from a power-supply voltage of a node to a serial bus connected to the node through a physical layer and a plurality of connectors conductive to each other of the node, which device, when none of a power-supply voltage of the node is supplied, supplies a DC voltage from the serial bus to the physical layer and when the power-supply voltage is supplied, cuts off a path for supplying a DC voltage from the serial bus to the physical layer to supply a DC voltage from the power-supply voltage to the physical layer.

13 Claims, 7 Drawing Sheets

BUS POWER-SUPPLY DEVICE AND NODE

BACKGROUND OF THE INVENTION

1. Field of the Invention

The present invention relates to a node connected to a serial bus and a bus power-supply device constituting the node suitable for IEEE-1394 Standards.

2. Description of the Related Art

In IEEE-1394 Standard information networks, as many as 63 of various nodes such as an audio visual apparatuses (AV apparatus) and a repeater, in addition to an information processing apparatus, can be connected on the same serial bus.

Then, an IEEE-1394 Standard serial bus includes a signal line for propagating a digital serial signal and a power-supply line. A node connected to the serial bus is therefore allowed to receive a supply of power from other nodes through a power-supply line to operate. As a result, IEEE-1394 Standard information networks have an advantage that not every node needs to be provided with an individual power source such as a commercial power-supply system. Hereinafter, an inherent power source each node individually has is also called "internal power source" for convenience' sake. On the other hand, a power source which is a direct-current (DC) voltage applied from other node through a serial bus is also called "bus power source".

Here, one example of IEEE-1394 Standard information networks is shown in FIG. 5. FIG. 5 schematically shows an example in which five nodes 101, 102, 103, 104 and 105 are connected to one bus line 110. In this example, since the node 101 and the node 105 are supplied with a power-supply voltage from a commercial power-supply system, also to other nodes 102 to 104, power is supplied from the node 101 or the node 105 through the bus line 110. The nodes 102 to 104 therefore need not to be provided with an internal power source.

Next, description will be made of one node connected to a conventional IEEE-1394 Standard serial bus.

Although nodes, except a repeater, in general, have various components including a link layer in addition to main components such as a bus power-supply circuit, description will be made in the following with reference to each drawing having illustration only of main components for making the present invention easy to understand.

FIG. 6 shows an example of a structure of a node defined by IEEE-1394-1995. As shown in FIG. 6, a node 100c includes a power-supply circuit 2, a DC—DC 25 converter 5 and a physical (PHY) layer 6 which are connected to a serial bus through two connectors 8 and 9.

The connectors 8 and 9 include power-supply terminals 81 and 91 and signal terminals 82 and 92, respectively. To the power-supply terminals 81 and 91, a DC voltage is applied from a power-supply line of the serial bus. Furthermore, in the node 100c, the power-supply terminals 81 and 91 of the two connectors 8 and 9 are conductive to each other. The node 100c is therefore allowed to relay a DC voltage applied though the serial bus to other nodes.

On the other hand, to/from the signal terminals 82 and 92, signals are input/output from/to a signal line of the serial bus. Then, a signal input through one signal terminal of the two signal terminals 82 and 92 is subjected to data resynchronization by a local clock at the physical layer 6 and then output through the other signal terminal.

This arrangement enables relay of transmission and reception of signals to and from nodes not adjacent to each other on the serial bus line.

The power-supply circuit 2 is a means for supplying a DC voltage to the physical layer 6 and the serial bus which transmit and receive signals. The power-supply circuit 2 therefore converts a power-supply voltage input through a power-supply voltage input terminal 1 into a DC voltage suitable for the supply to the serial bus and outputs the DC voltage. The output DC voltage is applied to the power-supply terminals 81 and 91 through a diode 7 for preventing reverse current and to the DC—DC converter 5 as well.

To the DC—DC converter 5, a DC voltage is applied not only from the power-supply circuit 2 but also from the serial bus through the power-supply terminal 81. Then, the DC—DC converter 5 converts the applied DC voltage into a DC voltage suitable for the supply to the physical layer 6 and outputs the converted DC voltage. The output DC voltage is applied to the physical layer 6.

The node 100c is thus structured such that the physical layer 6 can be driven by either of a DC voltage applied from the bus power source through the serial bus and a DC voltage applied by the internal power source through the power-supply circuit 2.

To the serial bus, a DC voltage within a wide range from DC+8V to DC+40V can be applied according to the IEEE-1394 Standard. According to the IEEE-1394a Draft Standard which is an improvement of IEEE-1394, a DC voltage can be applied within a range from DC+20V to DC+33V.

As a result, there occurs a case where DC voltages applied to the serial bus from power-supply circuits 2 of various nodes connected to each other through the serial bus differ with the nodes. In this case, the highest DC voltage will be applied to the entire serial bus. A node which supplies the highest voltage should supply power to physical layers of all the nodes on the serial bus regardless whether the other nodes are supplied or not supplied with power from internal power supply systems.

In the information network using a serial bus shown in FIG. 5, in a case where both of the first and the second nodes 101 and 102 are supplied with a power supply voltage, when a supply voltage to the first node 101 is higher than that to the second node 102, the first node 101 should supply power also to the remaining nodes including the second node 102. In other words, although the second node 102 has an internal power source, power will be supplied from the first node 101 to the second node 102.

In order to solve this problem "IEEE-1394a Draft Standard" proposes an improvement in the structure of a bus power-supply device of a node.

Here, FIG. 7 shows an example of an improved structure of a node 10d. As illustrated in FIG. 7, although the improved node 100d has the same components as those of the above-described node 100c, it has different wiring paths connecting a power-supply circuit 2, a DC—DC converter 5 and two power-supply terminals 81 and 91.

More specifically, in the node 10d, a DC voltage output from the power-supply circuit 2 is applied to the power-supply terminal 81 though a diode 7 for preventing reverse current and to the power-supply terminal 91 as well through a diode 14.

On the other hand, a DC voltage applied through the power-supply terminal 81 is applied to the DC—DC converter 5 through a diode 11, while a DC voltage applied through the power-supply terminal 91 is applied to the DC—DC converter 5 through a diode 12.

As a result, at the node 100d, on the two wiring paths connecting the power-supply terminals 81 and 91, two diodes should be disposed in series in opposite directions to each other without fail. In the node 100*d*, therefore, no direct current will flow between the power-supply terminals 81 and 91.

On the path from the power-supply terminal 81 to the power-supply terminal 91 through the diodes 11 and 12, for example, current directing from the power-supply terminal 81 to the power-supply terminal 91 will not flow due to the diode 12 and current in the opposite direction will not flow due to the diode 11. On the path from the power-supply terminal 81 to the power-supply terminal 91 through the diodes 7 and 14, current directing from the power-supply terminal 81 to the power-supply terminal 91 will not flow due to the diode 7 and current in the opposite direction will not flow due to the diode 14.

The improved node 100*d* is thus structured such that a DC voltage is applied only to its adjacent node among all the nodes connected by the serial bus. It is accordingly possible to reduce the volume of power supply required of a node having the highest DC voltage.

With the improved node, however, no direct current flows between the power-supply terminals 81 and 91, so that relay of a DC voltage applied through the serial bus to other nodes is impossible. There accordingly occurs a problem that no DC voltage can be applied to other nodes than an adjacent node. In other words, the node has a restriction that to a node having no internal power-supply system, its adjacent node should supply power.

In the network shown in FIG. 5, for example, to the second node 102 having no internal power source, a DC voltage is applied from its adjacent first node 101 through the serial bus. To the fourth node 104, a DC voltage is applied from its adjacent fifth node 105 through the serial bus.

To the third node 103, however, a DC voltage will be applied from nowhere because the third node 103 and its adjacent nodes have no supply of a power-supply voltage. Therefore, the physical layer of the third node 103 will not be driven and the third node 103 is accordingly not allowed to relay a signal. As a result, signal transmission and reception is not allowed between the first and the second nodes 101 and 102 and the fourth and the fifth nodes 104 and 105. In other words, an information network can not be established using a serial bus.

Moreover, even in the improved node, when a power-supply voltage is supplied to both of nodes adjacent to each other, a highest DC voltage will be applied to both the nodes. As a result, there occurs a problem that one node which outputs a higher DC voltage should supply power also to the other node even if the other node has an internal power source.

SUMMARY OF THE INVENTION

An object of the present invention, which is directed to solving the above-described problems, is to provide a bus power-supply device enabling relay of a DC voltage applied from a serial bus to be ensured and when a node has an internal power source, enabling application of a DC voltage from other node to a physical layer to be prevented, and node using such a device.

According to one aspect of the invention, a bus power-supply device structured to supply power from a power-supply voltage of a node to a serial bus connected to the node through a physical layer and a plurality of connectors conductive to each other of the node, wherein when none of a power-supply voltage of the node is supplied, a DC voltage is supplied from the serial bus to the physical layer, and when the power-supply voltage is supplied, a path for supplying a DC voltage from the serial bus to the physical layer is cut off to supply a DC voltage from the power-supply voltage to the physical layer.

Thus, according to a bus power-supply device of the present invention, since power-supply terminals of a plurality of connectors are conductive to each other, relay of a DC voltage applied through a serial bus to other node is possible. Application of a DC voltage to other nodes than an adjacent node is accordingly possible.

Furthermore, the device according to the present invention is structured such that a DC voltage is supplied from a serial bus when no power-supply voltage is supplied, while at the supply of a power-supply voltage, a DC voltage is supplied from the power-supply voltage. Thus, when a node has an internal power source, cut-off of a path for supplying a DC voltage from the serial bus to a physical layer prevents application of a DC voltage from other node to the physical layer. To the node having an internal power source, therefore, no power will be supplied from other nodes through the serial bus. As a result, the volume of power supply required of a node having the highest DC voltage can be reduced as much as that of the node having the internal power source.

In the preferred construction, the bus power-supply device comprises voltage detection means for detecting the power-supply voltage being supplied or not being supplied, and selection means for supplying a DC voltage coming from the serial bus to the physical layer when the voltage detection means is yet to detect supply of a power-supply voltage and cutting off the path for supplying a DC voltage from the serial bus to the physical layer to supply a DC voltage from the power-supply voltage to the physical layer when the voltage detection means detects supply.

Thus, with a voltage detection means and a selection means provided, supply of a power supply voltage can be detected by the voltage detection means and switching of a DC voltage source to be supplied to a physical layer at the time of application of a power supply voltage and at the time of non-application thereof can be made by the selection means.

In another preferred construction, the bus power-supply device comprises a comparator as the voltage detection means.

With the foregoing structure, comparison between a power-supply voltage or an output voltage of the power-supply circuit and a reference voltage enables detection of supply of a power-supply voltage with ease.

In another preferred construction, the bus power-supply device comprises as the selection means a first path for supplying power from the power-supply voltage to the physical layer, and a second path for supplying power coming from the serial bus to the physical layer, wherein when power is supplied from the power-supply voltage, the second path is cut off.

Thus, cutting-off a second path at the time of supply of a power-supply voltage results in application of no DC voltage from the serial bus to the physical layer. Accordingly, to a node having an internal power source, no power is supplied from other nodes through the serial bus. As a result, the volume of power supply required of a node having the highest DC voltage can be reduced as much as that of the node having the internal power source.

A first path may be cut off or rendered conductive at the time of non-application of a power-supply voltage. In a case where the path is rendered conductive, it is necessary to provide such a means for preventing reverse current as a diode on the first path.

In another preferred construction, the bus power-supply device comprises a semiconductor switch as the selection means.

Thus, provision of a semiconductor switch such as a transistor as the selection means enables switching and selection of a path by conduction and cut-off of the semiconductor switch to be controlled with ease by an output voltage of the voltage detection means.

In another preferred construction, the bus power-supply device comprises a relay element as the voltage detection means and the selection means.

Supplying a power-supply voltage to a relay element enables displacement of a contact point of relay. Then, making use of the contact point for the switching of a DC voltage source applied to the physical layer allows the relay element to be used as the voltage detection means and the selection means.

In another preferred construction, the bus power-supply device comprises a power-supply circuit for converting the power-supply voltage into a DC voltage for the serial bus and outputting the DC voltage, voltage conversion means for converting a DC voltage output from the power-supply circuit into a DC voltage for the physical layer, voltage detection means for detecting the power-supply voltage being supplied or not being supplied to the power-supply circuit, and selection means for supplying a DC voltage applied from the serial bus to the voltage conversion means when the power-supply voltage is not supplied to the power-supply circuit and cutting off a path for supplying a DC voltage from the serial bus to the voltage conversion means to supply an output of the power-supply circuit to the voltage conversion means when the power-supply voltage is supplied.

Thus, with a power-supply circuit, a voltage conversion means, a voltage detection means and a selection means provided, a DC voltage to be suitably supplied to a serial bus can be output by the power-supply circuit and the DC voltage can be further converted into a DC voltage to be suitably supplied to a physical layer by the voltage conversion means. Therefore, a DC voltage different from that to be applied to the serial bus can be applied to the physical layer.

Thereupon, supply of a power-supply voltage to the power-supply circuit is detected by the voltage detection means. Then, based on the detection result, switching of a DC voltage source to be supplied to the voltage conversion means can be made by the selection means at the time of application and non-application of a power-supply voltage.

In another preferred construction, the voltage detection means detects the power-supply voltage being supplied or not being supplied by detecting an output voltage of the power-supply circuit.

The foregoing structure enables reliable detection of no supply of power from a power supply voltage to a physical layer when although a power-supply voltage is supplied, no DC voltage is output from the power-supply circuit to the physical layer due to a failure of the power-supply circuit etc. It is accordingly possible to reliably supply a DC voltage from the serial bus to the physical layer even when the power-supply circuit fails.

In another preferred construction, the bus power-supply device further comprises as the selection means a first path for supplying power from the power-supply voltage to the physical layer, and a second path for supplying power coming from the serial bus to the physical layer, wherein
when power is supplied from the power-supply voltage, the second path is cut off, the voltage detection means detects the power-supply
voltage being supplied or not being supplied by detecting an output voltage of the power-supply circuit.

In another preferred construction, the bus power-supply device comprises as the selection means
a first path for supplying power from the power-supply voltage to the physical layer, and a second path for supplying power coming from the serial bus to the physical layer, wherein
when power is supplied from the power-supply voltage, the second path is cut off, and
the selection means is structured by a semiconductor switch.

In another preferred construction, the voltage detection means detects the power-supply voltage being supplied or not being supplied by detecting an output voltage of the power-supply circuit, and
the selection means is structured by a semiconductor switch.

According to another aspect of the invention, a node connected to a serial bus, comprises
a plurality of connectors connected to the serial bus each having a power-supply terminal to which a DC voltage is applied from other nodes and a signal terminal to and from which a signal from other nodes is input and output,
a physical layer for outputting a signal input through a signal terminal of one connector from a signal terminal of the other connector, and
a bus power-supply device structured to supply power from a power-supply voltage to the physical layer and the serial bus, wherein
power-supply terminals of the plurality of connectors are rendered conductive to each other,
the bus power-supply device
supplies a DC voltage from the serial bus to the physical layer through the power-supply terminal when none of a power-supply voltage of the node is supplied, and
cuts off a path for supplying a DC voltage from the serial bus to the physical layer to supply a DC voltage from the power-supply voltage to the physical layer when the power-supply voltage is supplied.

Thus, the node according to the present invention enables relay of a DC voltage applied through the serial bus to other nodes, as well as enabling application of a DC voltage from other nodes to the physical layer to be prevented through cut-off of a path for supplying a DC voltage from the serial bus to the physical layer when the node has an internal power source. It is therefore possible to reduce a volume of power supply required of a node having the highest DC voltage as much as that of a node having an internal power source while ensuring relay of a DC voltage applied through the serial bus.

In the preferred construction, the bus power-supply device comprises voltage detection means for detecting the power-supply voltage being supplied or not being supplied, and selection means for supplying a DC voltage coming from the serial bus to the physical layer when the voltage detection means is yet to detect supply of a power-supply voltage and cutting off the path for supplying a DC voltage from the serial bus to the physical layer to supply a DC voltage from the power-supply voltage to the physical layer when the voltage detection means detects supply.

In another preferred construction, the node comprises as the selection means of the bus power-supply device
a first path for supplying power from the power-supply voltage to the physical layer, and
a second path for supplying power coming from the serial bus to the physical layer, wherein
when power is supplied from the power-supply voltage, the second path is cut off.

In another preferred construction, the bus power-supply device comprises
a power-supply circuit for converting the power-supply voltage into a DC voltage for the serial bus and outputting the DC voltage,
voltage conversion means for converting a DC voltage output from the power-supply circuit into a DC voltage for the physical layer,
voltage detection means for detecting the power-supply voltage being supplied or not being supplied to the power-supply circuit, and
selection means for supplying a DC voltage applied from the serial bus to the voltage conversion means when the power-supply voltage is not supplied to the power-supply circuit and cutting off a path for supplying a DC voltage from the serial bus to the voltage conversion means to supply an output of the power-supply circuit to the voltage conversion means when the power-supply voltage is supplied.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscuring the present invention.

In the following, embodiments of a power-supply device and a node provided therewith according to the present invention will be described with reference to the drawings.

First Embodiment

First, a first embodiment of the present invention will be described with reference to FIG. 1.

Figure 1:
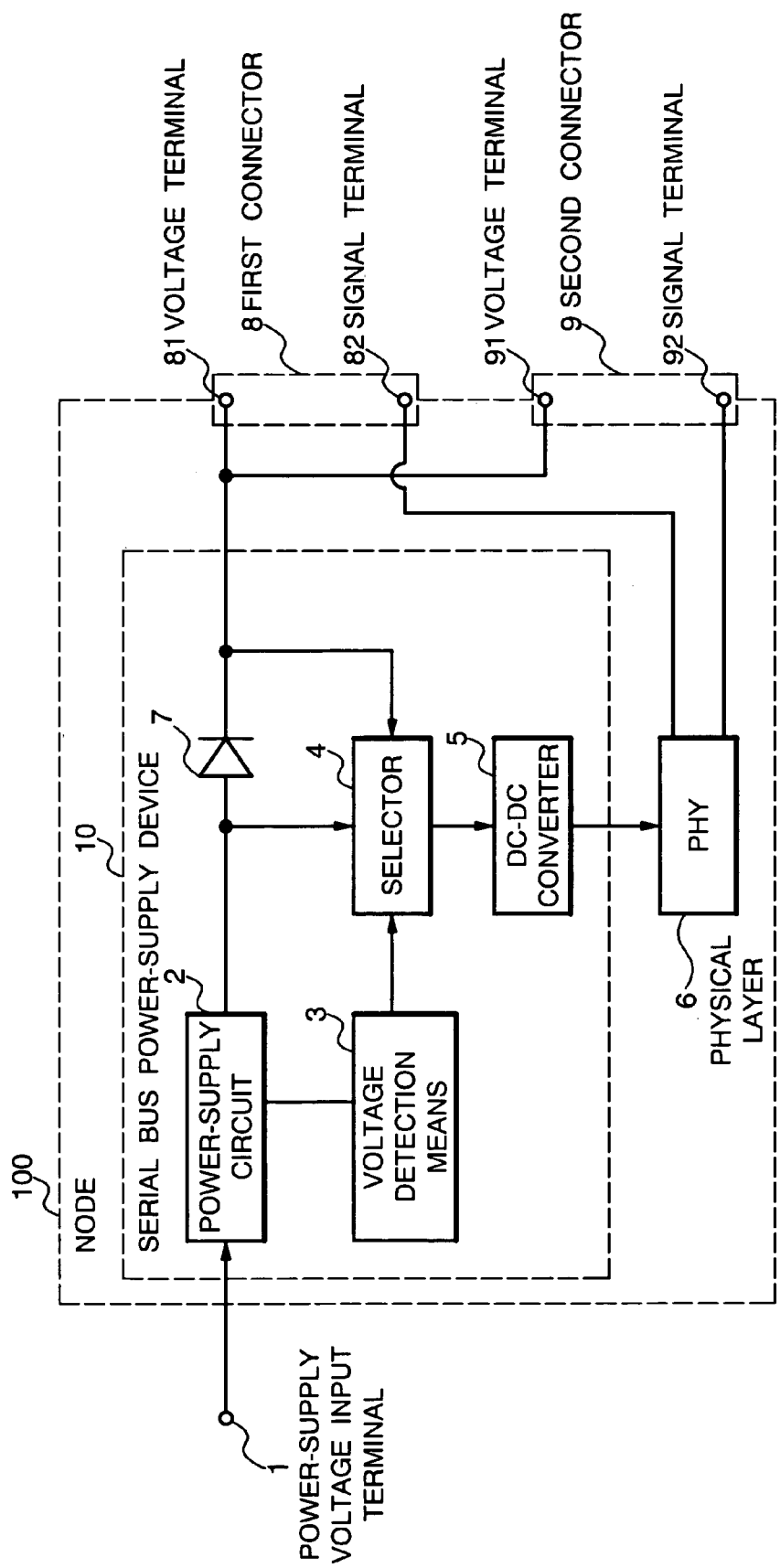
FIG. 1 is a block diagram for use in explaining a bus power-supply device and a node according to a first embodiment of the present invention.
Figure 6:
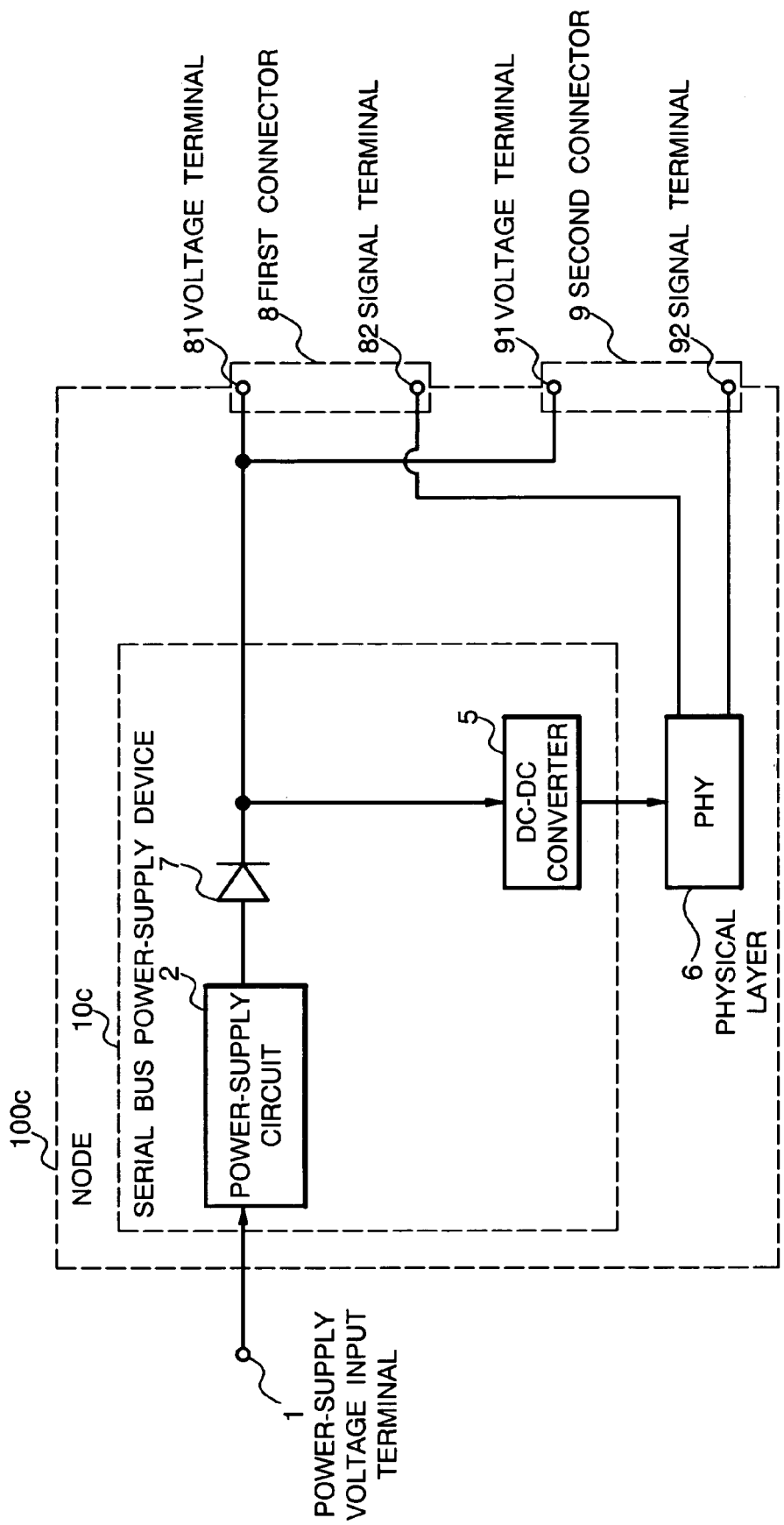
FIG. 6 is a block diagram for use in explaining an example of a structure of a conventional node.
Figure 7:
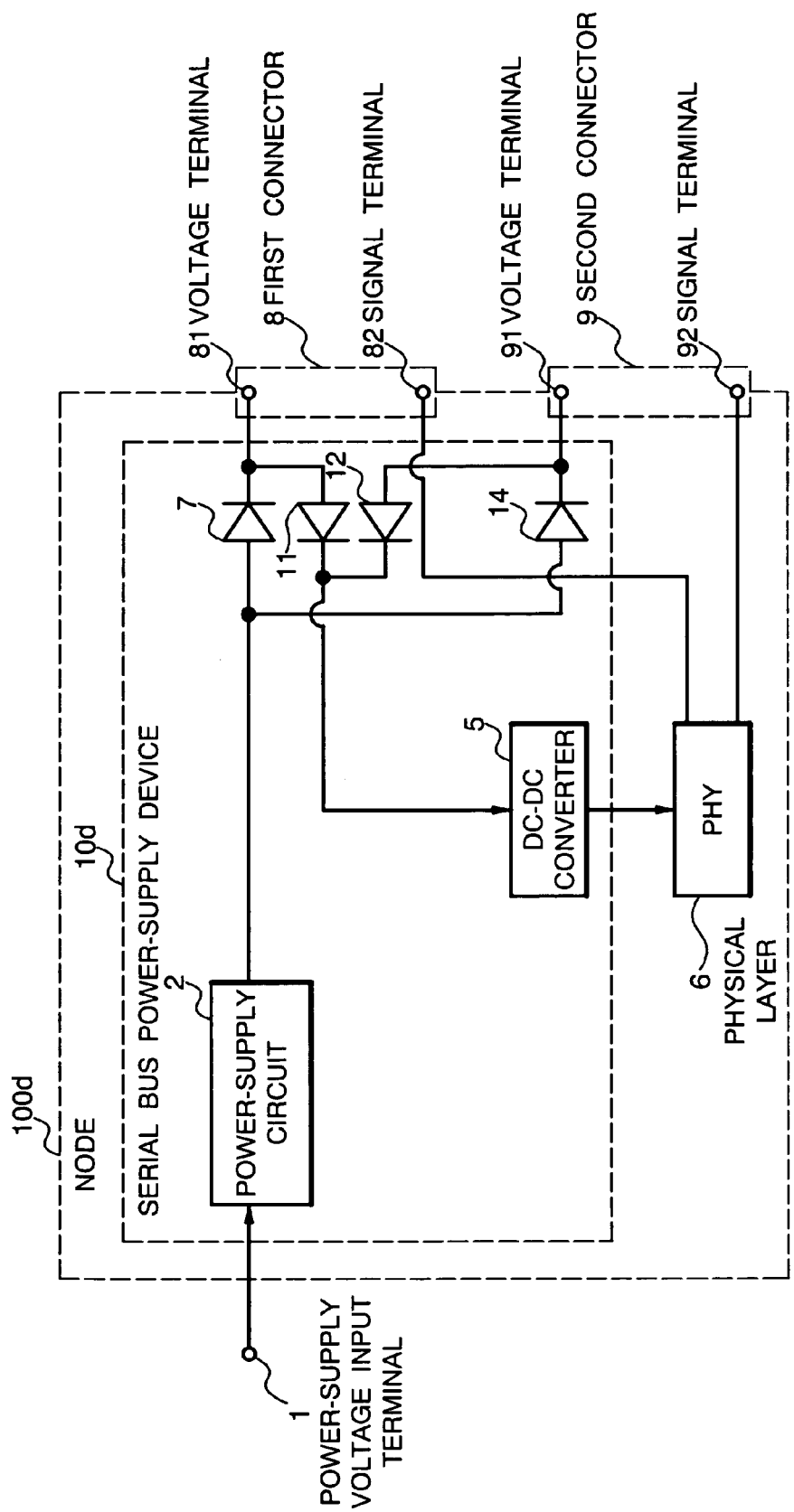
FIG. 7 is a block diagram for use in explaining an example of a structure of a conventional node.

FIG. 1 is a block diagram showing a node 100, particularly, for explaining a structure of a bus power-supply device 10 constituting the node 100 according to the first embodiment. The node 100 of the first embodiment includes, similarly to the conventional node 100c shown in FIG. 6, a physical (PHY) layer 6, and a first connector 8 and a second connector 9. These two connectors 8 and 9 are conductive to each other. Of the same components as those of the conventional art, no detailed description will be made.

Then, the node 100 of the present embodiment further includes a bus power-supply device 10. The bus power-supply device 10, being supplied with no power-supply voltage, supplies a DC voltage from a bus power source to the physical layer 6 through a serial bus and when being supplied with a power-supply voltage as an internal power source from a power-supply voltage input terminal 1, applies a DC power source to the serial bus, as well as supplying a DC voltage from the internal power source to the physical layer 6 as required.

In order to realize such functions, the bus power-supply device 10 includes a power-supply circuit 2, a voltage detection unit 3, a selector 4 as a selection means, and a DC—DC converter 5 as a voltage conversion means. Then, the power-supply circuit 2 and power-supply terminals 81 and 91 of the connectors are connected through a diode for preventing reverse current of electric currents from the power-supply terminals 81 and 91 to the power-supply circuit 2.

The power-supply circuit 2 converts a power-supply voltage of a commercial voltage (e.g. AC 100 V) applied to the power-supply voltage input terminal 1 into a DC voltage for serial bus and outputs the converted voltage. In the present embodiment, the power-supply circuit 2 outputs, for example, 24V DC voltage, as a DC voltage within a range from DC+20V to DC+33V meeting "IEEE-1394a Draft Standard".

The DC—DC converter 5 converts a DC voltage output from the power-supply circuit into a DC voltage for physical layer. In the present embodiment, the DC—DC converter 5 is structured so as to cope with a DC voltage within a range from DC+8V to DC+40V which meets the IEEE-1394 Standard. Then, the DC—DC converter converts the applied DC voltage into a DC voltage, for example, of 3.3 V for physical layer.

In addition, the voltage detection unit 3 detects supply/non-supply of a power-supply voltage from the power-supply voltage input terminal 1 to the power-supply circuit 2. In the present embodiment, the voltage detection unit 3 detects an output voltage of the power-supply circuit 2 to detect supply-non-supply of a power-supply voltage. This arrangement provides that no power-supply voltage is supplied when the power-supply circuit 2 fails.

Then, the selector 4 is a means for switching a DC voltage source to be applied to the physical layer 6 through the DC—DC converter 5. Then, when no power-supply voltage is supplied to the power-supply circuit 2, the selector 4 supplies a DC voltage applied from the bus power source through the serial bus to the physical layer 6. On the other hand, when a power-supply voltage from the internal power source is supplied to the power-supply circuit 2, the selector 4 cuts off the path for supplying a DC voltage from the serial bus to the physical layer 6 and supplies the output of the power-supply circuit 2 to the physical layer 6.

Thus, the node according to the first embodiment enables relay of a DC voltage applied from the serial bus to other nodes, as well as enabling application of a DC voltage to the physical layer from other nodes to be prevented by cutting off a path for supplying a DC voltage from the serial bus to the physical layer when the node has an internal power source. It is accordingly possible to reduce the volume of power supply required of a node having the highest DC voltage on the network as much as that of a node having an internal power source among the nodes according to the present invention.

Second Embodiment

Next, a second embodiment of the present invention will be described with reference to FIG. 2.

Figure 2:
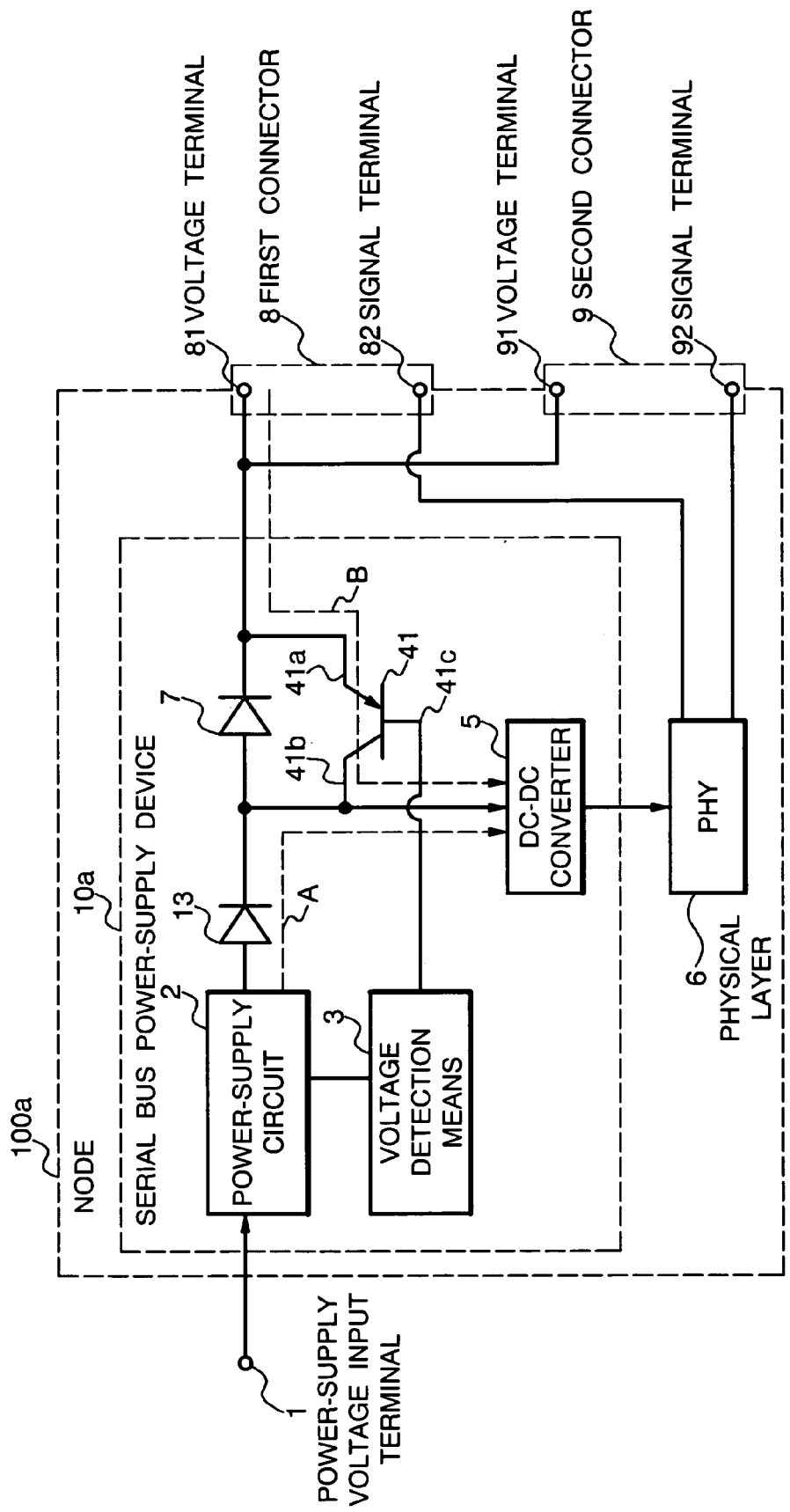
FIG. 2 is a block diagram for use in explaining a bus power-supply device and a node according to a second embodiment of the present invention.

FIG. 2 is a block diagram showing a node 100a, particularly, for explaining a structure of a bus power-supply device 10a constituting the node 100a according to the second embodiment. As shown in FIG. 2, the node 100a of the second embodiment includes a transistor 41 and a diode 13 as a selector. In the second embodiment, the same components as those of the first embodiment are given the same reference numerals and no detailed description is made thereof.

A first electrode 41a of the transistor 41 is connected to power-supply terminals 81 and 91. A second electrode 41b of the transistor 41 is connected to a physical layer 6 through a DC—DC converter 5 and to a power-supply circuit 2 as well through the diode 13. The diode 13 is inserted for preventing reverse current from the power-supply terminals 81 and 91 from flowing to the power-supply circuit 2 on the power-supply voltage side.

Furthermore, a control electrode 41c of the transistor 41 is connected to a voltage detection unit 3. Accordingly, an output voltage of the voltage detection unit 3 enables path switching and selection by conduction and cut-off of the transistor 41 to be controlled with ease.

More specifically, in the second embodiment, a first path A for supplying power from a power-supply voltage to the physical layer 6 through the power-supply circuit 2 and a second path B for supplying power from the serial bus to the physical layer 6 through the transistor 41 are provided.

In FIG. 2, the first path and the second path are schematically illustrated by broken lines A and B along the actual paths.

Then, when power is supplied from the power-supply voltage, the second path B is cut off by the transistor 41. In other words, the transistor 41 enables control of application/non-application of a DC voltage from the serial bus to the physical layer 6 with ease.

As a result, cutting off the second path B at the time of supply of a power-supply voltage leads to prevention of application of a DC voltage from the serial bus to the physical layer. To a node having an internal power source, accordingly, no power will be supplied from other nodes through the serial bus. As a result, it is possible to reduce the volume of power supply required of a node having the highest DC voltage on the network as much as that of a node having an internal power source among the nodes according to the present invention.

Next, description will be made of an example of a structure of the voltage detection unit 3 in the second embodiment with reference to FIG. 3.

Figure 3:
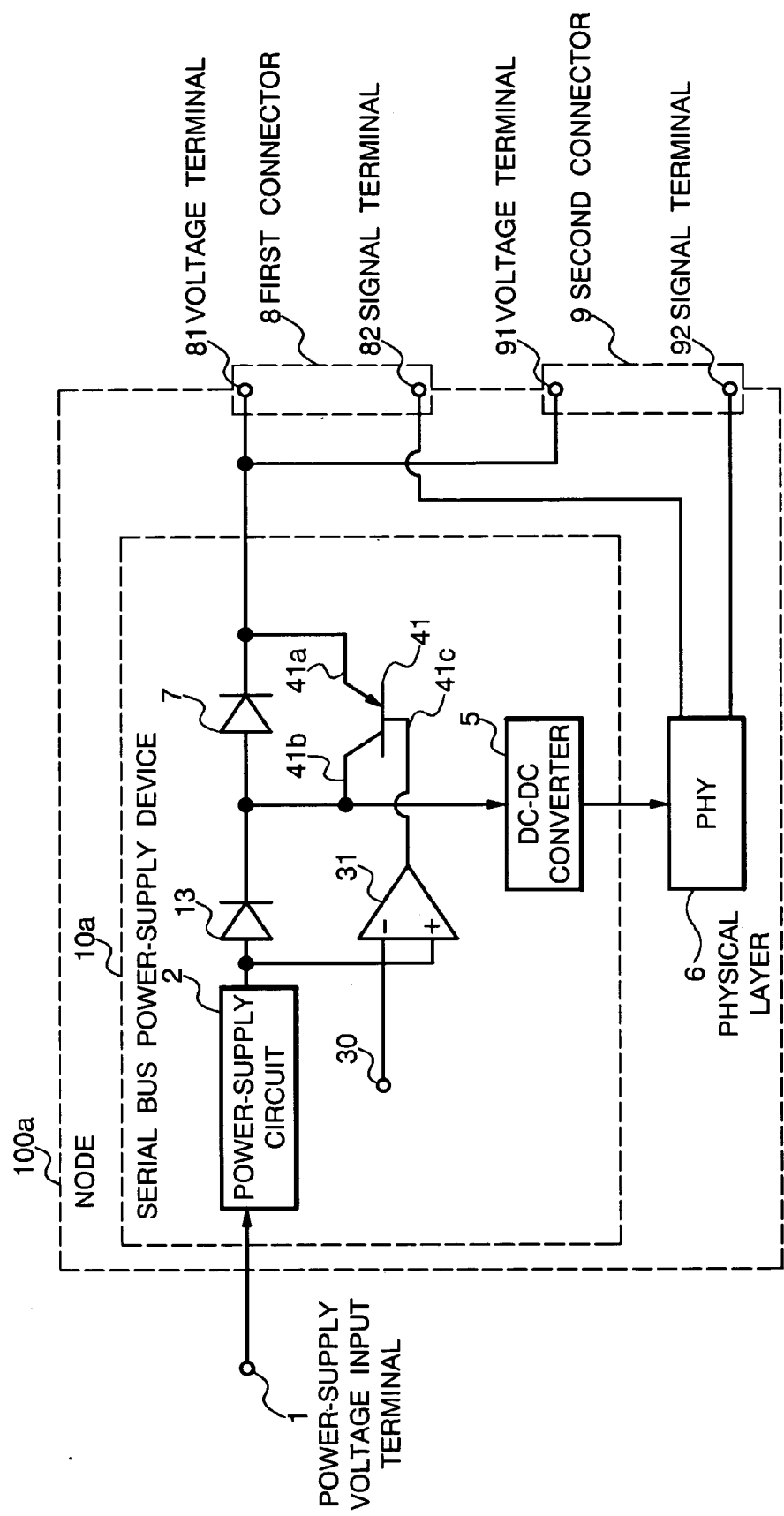
FIG. 3 is a block diagram for use in explaining a voltage detection unit according to the second embodiment.

The voltage detection unit 3 illustrated in FIG. 3 includes a comparator 31. The comparator 31 compares a reference voltage (e.g. 5V) applied to a reference voltage input terminal 30 and an output voltage of the power-supply circuit 2. Then, the comparator 31, when the output voltage is higher than the reference voltage, turns off an open collector output of the comparator 31 considering that a power-supply voltage is being applied. On the other hand, when the output voltage is lower than the reference voltage, the comparator 31 turns on, for example, an open collector output considering that no power-supply voltage is being applied.

Accordingly, application of an output signal of the comparator 31 to the control electrode 41c of the transistor 41 leads to cut-off of the second path B (see FIG. 2) for supplying a DC voltage to the physical layer 6 from the serial bus to supply an output of the power-supply circuit 2 to the voltage conversion means only when the comparator 31 detects a voltage.

Third Embodiment

Next, a third embodiment of the present invention will be described with reference to FIG. 4.

Figure 4:
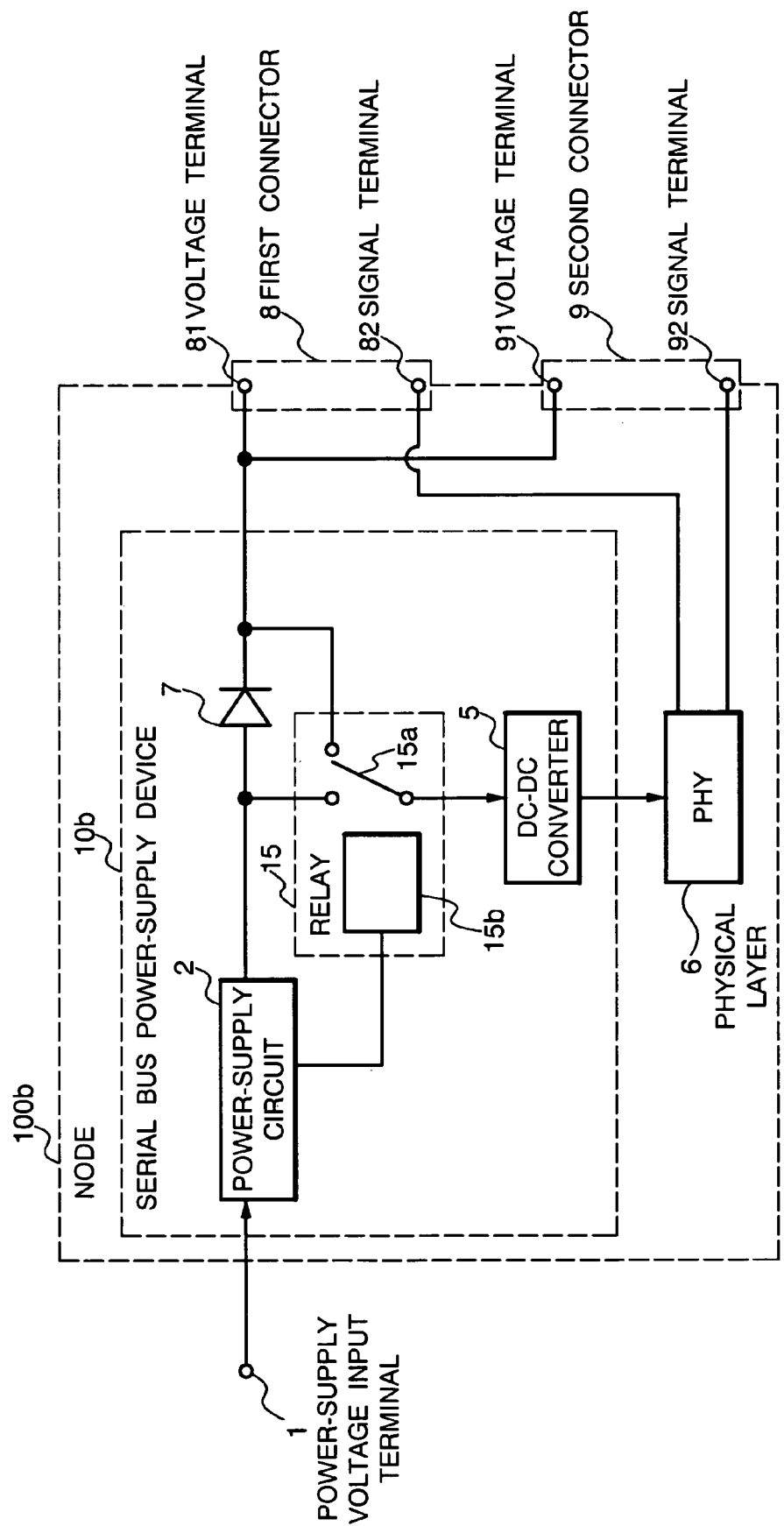
FIG. 4 is a block diagram for use in explaining a bus power-supply device and a node according to a third embodiment of the present invention.
Figure 5:
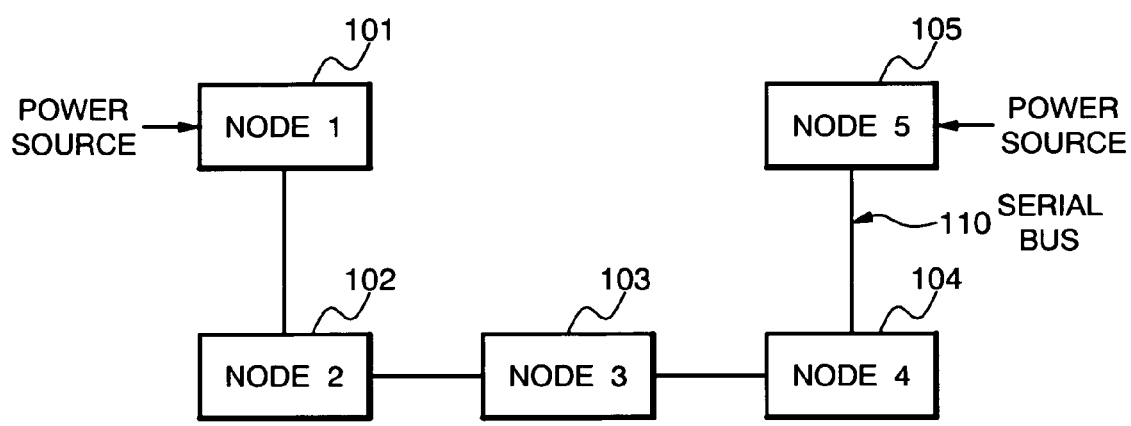
FIG. 5 is a schematic diagram showing an information network in which a node is connected to a serial bus based on IEEE-1394 Standard.

FIG. 4 is a block diagram showing a node 10b, particularly, for explaining a structure of a bus power-supply device 10b constituting the node 100b according to the third embodiment. As shown in FIG. 4, the node 100b of the third embodiment is provided with a relay element 15 as a voltage detection means and a selection means. In the third embodiment, the same components as those of the first embodiment are given the same reference numerals and no detailed description is made thereof.

To a main body 15b of the relay element 15, a voltage is applied from a power-supply circuit 2. Accordingly, when a power-supply voltage is applied to the power-supply circuit 2, a voltage is also applied to the main body 15b of the relay element 15. As a result, supply of a power-supply voltage leads to displacement of the position of a relay contact point 15a. Displacement of the contact point 15a therefore results in switching of a DC voltage source to be applied to a physical layer 6 between an internal power source and an external power source.

More specifically, when a power-supply voltage is applied, the contact point 15a cuts off a path for supplying power from power-supply terminals 81 and 91 and connects the power-supply circuit 2 and a DC—DC converter 5. On the other hand, when no power-supply voltage is applied, the contact point connects the power-supply terminals 81 and 91 with the DC—DC converter 5. With this arrangement, to a node having an internal power source, no power will be supplied from other nodes through the serial bus. It is accordingly possible to reduce the volume of power supply required of a node having the highest DC voltage on the network as much as that of a node having an internal power source among the nodes having the bus power-supply circuit according to the present invention.

Although the foregoing embodiments have been described with respect to an example in which the present invention is structured on specific conditions, the present invention allows various modifications. For example, although in the above-described second embodiment, the first path A (see FIG. 2) is conductive also at the time of non-application of a power-supply voltage, it may be cut off at the time of non-application in the present invention.

In addition, although the foregoing embodiments have been described with respect to an example of a node having two connectors, the present invention can be realized by the provision of at least two connectors. Three or more connectors may be provided to relay a DC voltage or a signal between these connectors.

Moreover, although in a network connected by an IEEE-1394 Standard serial bus, it is desirable that all the nodes have the bus power-supply device according to the present invention, not all the nodes need to be provided with the bus power-supply device of the present invention. A part of the nodes on the network may include the bus power-supply device according to the present invention.

As described in the foregoing, the present invention enables relay of a DC voltage applied from a serial bus to other nodes, as well as enabling application of a DC voltage from other nodes to a physical layer to be prevented when a node has an internal power source. It is accordingly possible to reduce the volume of power supply required of a node having the highest DC voltage as much as that of a node having an internal power source.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A bus power-supply device in a node for connection to a serial bus, said bus power-supply device structured to supply power from a power-supply voltage of a node of a proceeding stage to a node of a next stage through the serial bus connected to said node by a physical layer and a plurality of connectors conductive to each other of the node, comprising:
   a power-supply circuit which converts said power-supply voltage into a DC voltage for said serial bus and outputs said DC voltage;
   a converter which converts a DC voltage output from said power-supply circuit into a DC voltage for said physical layer;
   a voltage detection unit which detects said power-supply voltage being supplied or not being supplied to said power-supply circuit;
   a first means connected between said power-supply circuit and said converter for supplying a DC voltage outputted from said power-supply circuit to the serial bus, and for preventing application to said power-supply circuit of a DC voltage from the serial bus;
   a second means connected between said converter and the serial bus for supplying a DC voltage outputted from said power-supply circuit to the serial bus, and for preventing application to said converter and said power-supply circuit of a DC voltage from said serial bus; and
   a switch which is connected in parallel with said second means and controlled by an output signal outputted from said voltage detection unit;
   wherein when an output voltage of said power-supply circuit is detected, said switch is turned off, and when an output voltage of said power-supply circuit is not detected, said switch is turned on.

2. The bus power-supply as set forth in claim 1, wherein said serial bus is an IEEE-1394-1995 Standard serial bus.

3. The bus power-supply device as set forth in claim 1, comprising:
   a first path for supplying power from said power-supply voltage to said physical layer; and
   a second path for supplying power coming through said serial bus to said physical layer, wherein
   when power is supplied from said power-supply voltage, said selector cuts off said second path by ON and OFF.

4. The bus power-supply device as set forth in claim 1, wherein said switch is a semiconductor switch.

5. The bus power-supply device as set forth in claim 1, wherein said voltage detection unit detects said power-supply voltage being supplied or not being supplied by detecting an output voltage of said power-supply circuit.

6. The bus power-supply device as set forth in claim 1, wherein said voltage detection unit detects said power-supply voltage being supplied or not being supplied by detecting an output voltage of said power-supply circuit, and wherein said switch is a semiconductor switch.

7. The bus power-supply device as set forth in claim 1, wherein said voltage detection unit is a comparator which detects said power-supply voltage being supplied or not being supplied by comparing an output voltage of said power-supply circuit with a reference voltage.

8. A node having a bus power-supply device structured to supply power from a power-supply voltage to a node of a next stage through a serial bus connected to said node by a physical layer and a plurality of connectors conductive to each other of the node, comprising:
   a plurality of connectors each having a power-supply terminal to which a DC voltage is applied from other nodes through said serial bus and a signal terminal to and from which a signal from other nodes is in input and output;
   a physical layer which outputs a signal input through a signal terminal of one connector to a signal terminal of the other connector, wherein
   power-supply terminals of said plurality of connectors are rendered conductive to each other,
   said bus power-supply device comprises
   a power-supply circuit which converts said power-supply voltage into a DC voltage for said serial bus and outputs said DC voltage;
   a converter which converts a DC voltage output from said power-supply circuit into a DC voltage for said physical layer;
   a voltage detection unit which detects said power-supply voltage being supplied or not being supplied to said power-supply circuit;
   a first means connected between said power-supply circuit and said converter for supplying a DC voltage outputted from said power-supply circuit to the serial bus, and for preventing application to said power-supply circuit of a DC voltage from the serial bus;
   a second means connected between said converter and the serial bus for supplying a DC voltage outputted from said power-supply circuit to the serial bus, and for preventing application to said converter and said power-supply circuit of a DC voltage from the serial bus; and a switch which is connected in parallel with said second means and controlled by an output signal outputted from said voltage detection unit;

wherein when an output voltage of said power-supply circuit is detected, said switch is turned off, and when an output voltage of said power-supply circuit is not detected, said switch is turned on.

9. The node as set forth in claim 8, comprising a first path for supplying power from said power-supply voltage to said physical layer; and a second path for supplying power coming through said serial bus to said physical layer, wherein said switch of said bus power-supply device performs connection and cutting of said second path by ON and OFF.

10. The node as set forth in claim 8, wherein said voltage detection unit of said bus power-supply device detects said power-supply device detects said power-supply voltage being supplied or not being supplied by detecting an output voltage of said power-supply circuit.

11. The node as set forth in claim 8, wherein said switch of said bus power-supply device is a semiconductor switch.

12. The node as set forth in claim 8, wherein said voltage detection unit of said bus power-supply device detects said power-supply voltage being suppled or not being supplied by detecting an output voltage of said power-supply circuit, and wherein said switch of said bus power-supply device is a semiconductor switch.

13. The node as set forth in claim 8, wherein said voltage detection unti of said bus power-supply device is a comparator which detects said power-supply voltage being supplied or not being supplied by comparing an output voltage of said power-supply circuit with a reference voltage.

* * * * *